April 14, 1931.  R. H. DANEEL  1,800,780
MEANS FOR INFLATING PNEUMATIC TIRES
Filed March 6, 1930   2 Sheets-Sheet 1
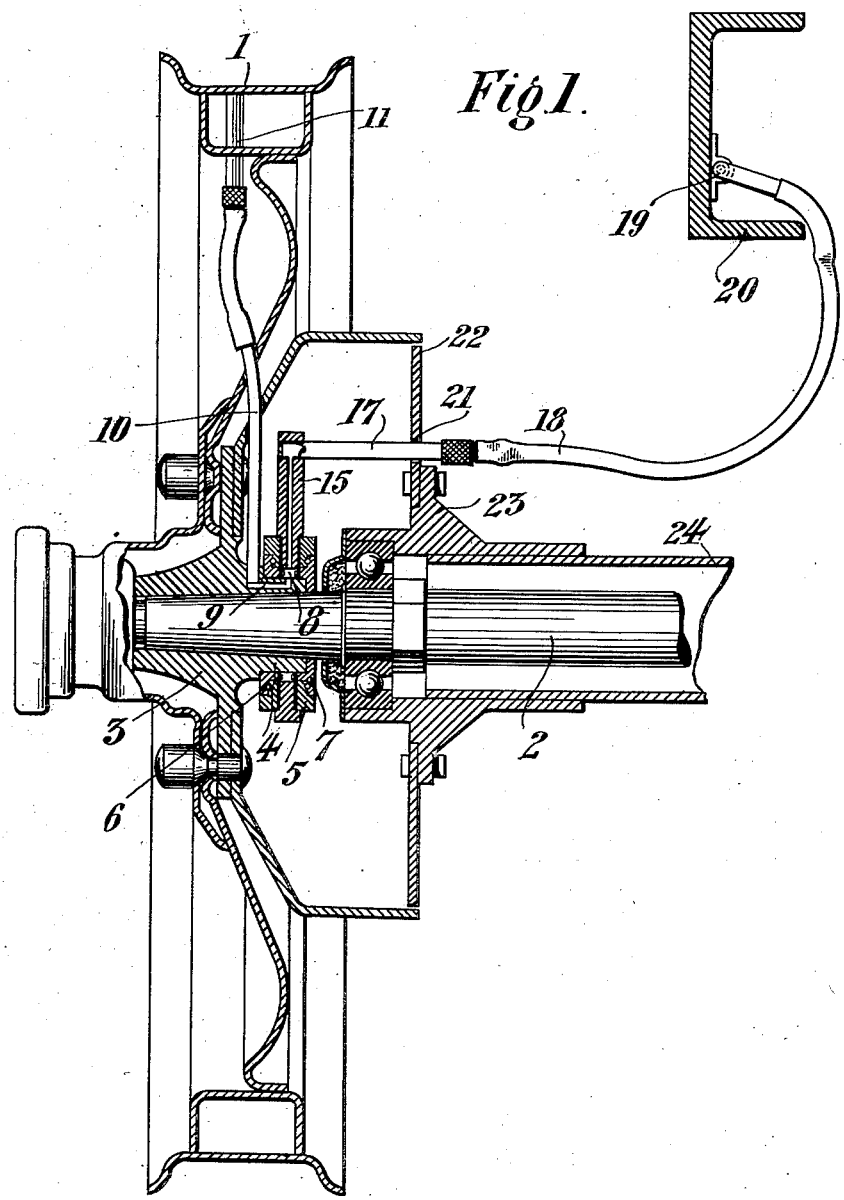

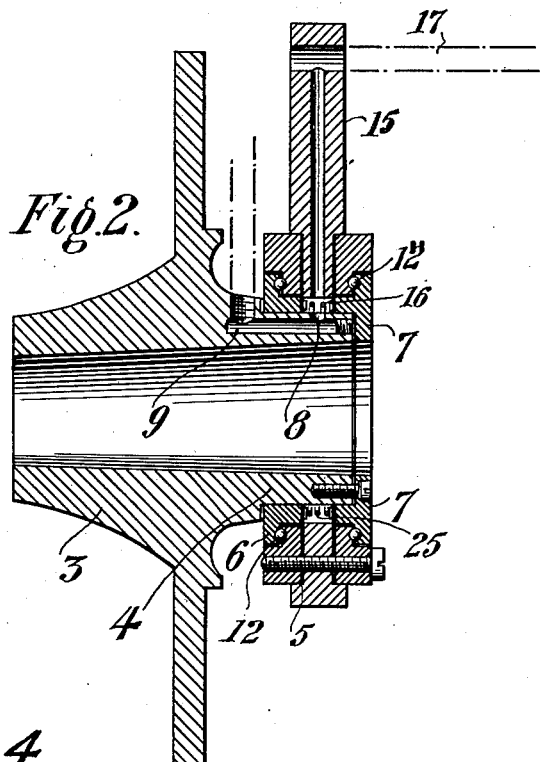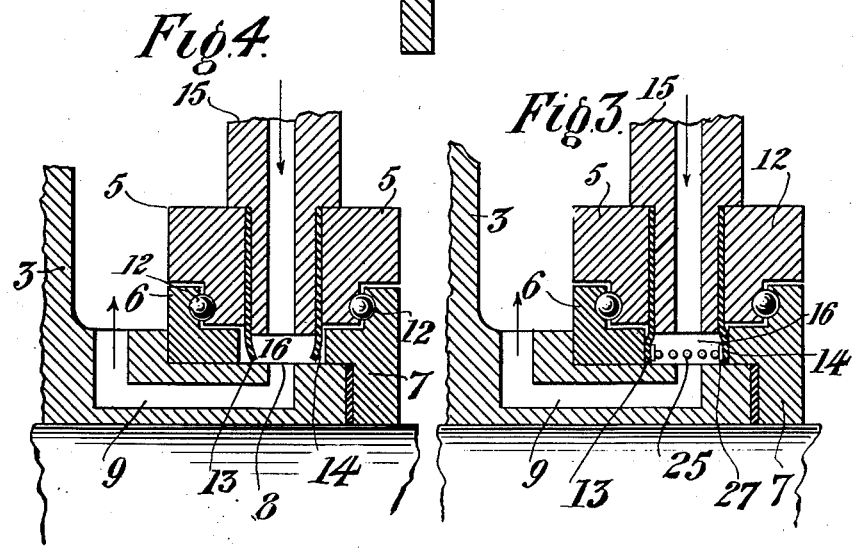

Patented Apr. 14, 1931

1,800,780

UNITED STATES PATENT OFFICE

RICHARD HURTLEY DANEEL, OF BRITSTOWN, SOUTH AFRICA

MEANS FOR INFLATING PNEUMATIC TIRES

Application filed March 6, 1930, Serial No. 433,746, and in Great Britain December 23, 1929.

This invention relates to means for communicating fluid pressure from a stationary part to a rotary part; and it is particularly applicable to means for conveying air pressure from a compressor on a motor vehicle to a tire or to several tires on the wheels of the said vehicles.

The object of the present invention is to provide a means which is essential to the success of such a system of tire inflation, such that the junction between the stationary and the moving parts shall not introduce unnecessary friction to the running of the car, and also that the construction may be such that the tires may be inflated to a predetermined pressure in each independently or in two or more of the tires simultaneously from the pressure supply on the car, either when stationary or when running, and that such pressure air may be transmitted and maintained to any of the tires while the car is running, in order to supply a punctured tire or tires with pressure at a rate to compensate for the puncture leakage and thus permit of the car running until it is convenient to change the wheel or repair the puncture.

According to this invention the means provided for communicating the pressure fluid from one part to the other part comprises inner and outer members, the inner central portion of the said outer member and the outer central portion of the said inner member forming opposed walls of an annular chamber to which passages for the flow of fluid communicate, and two faces on one of the members forming opposed walls of the chamber in an axial direction, anti-friction bearings on the inner member supporting the outer member and permitting free relative rotary motion between the members, and two annular gaskets adapted to bear against the said faces on one member and fixed to the other member to seal the chamber when fluid pressure is received therein, whereby the outer member is so supported on the inner member that the pressure communicated to the annular chamber is equally distributed in all directions and does not tend to displace the two members in an axial or any other direction.

When applied to the hub of a wheel, the inner member is formed as an extension on the hub or axle, and the outer member is formed as a sleeve provided around such extension. The extension is provided with flanges and the sleeve is carried by bearings which are preferably ball bearings running on the flanges. The extension, the flanges and the sleeve form an annular chamber connected by means of a tube with the tire or the air supply and which chamber encircles the extension and is exposed thereto in its inner periphery, and the extension is formed with a port or ports open to the annular chamber and which communicates by way of a lateral passage in the extension with a tube extending to the valve of the tire and the sleeve is provided with a port open to the annular chamber which communicates with the compressed air supply. The sealing of the air between the annular chamber and the flanges is effected by means of flexible annular gaskets on one part which bear against the faces of the flanges on the other part, in such a manner that the air pressure in the chamber presses the gaskets in opposite directions against the rigid faces. It is between these flexible and rigid faces that contacting relative rotary movement takes place. The gaskets may be fitted to the stationary part or to the rotary part, and it is preferable to hold the gaskets in light contact with the smooth rigid faces by a spring or springs tending to keep the said flexible faces lightly against the said rigid faces.

In the accompanying drawings:—

Fig. 1 shows vehicle wheel and part of an axle assembly, Fig. 2 shows an enlarged view of the wheel hub, Fig. 3 shows an enlarged fragmentary detail view of the wheel, and Fig. 4 is a similar view to Fig. 3 illustrating the position taken up by gaskets when the light spring is not provided, and when the pressure fluid is cut off.

In the example of construction shown in Figs. 1 to 3 of the drawings both the wheel 1 and the axle 2 rotate. The wheel hub 3 is provided with an internal extension 4 around which is mounted an outer member in the form of an annular sleeve 5, forming opposed walls of an annular chamber 16. The extension 4 which constitutes the inner member having two rigid circular flanges 6 and 7 opposed to each other, the two internal faces of which form opposed walls of the chamber in an axial direction. Between these flanges a port 8 in the extension opens to a passage 9 from which a tube 10 passes to a valve 11 of the tire (not shown). The annular sleeve 5 runs on ball bearings 12 located between the sleeve and the flanges 6 and 7, and this sleeve has two flexible gaskets 13 and 14 which extend towards the axis of rotation of the wheel and rest against the interior faces of the flanges 6 and 7. To the sleeve 5 is fitted a tubular crank consisting of a radial tube 15, the interior of which communicates with the annular chamber 16 between the gaskets 13 and 14, and an inwardly extending tube 17 which communicates with the radial tube, and is connected by a flexible tube 18 to a tube 19 mounted on the chassis 20 of the vehicle and connected to the compressor. The tube 17 passes through a hole 21 in a ring plate 22 fixed to a flange 23 on the fixed axle casing 24, whereby the tubular crank together with the annular sleeve 5 are anchored against rotation.

The inner portions of the gaskets 13 and 14 are held lightly apart and against the flanges by a coil spring 25 and washers 26 and 27 in order to maintain a light initial pressure of the gaskets against the rigid faces of the flanges 6 and 7.

Fig. 4 shows clearly the position which the gaskets would take up when the fluid pressure is cut off and the light spring not provided.

It will be seen by the above construction that the flanges 6 and 7 are free to run on the ball bearings 12, and when fluid pressure is admitted to the annular space 16 the gaskets 13 and 14 are firmly held by the fluid pressure acting in opposite directions against the flanges 6 and 7 and make a good air-tight fit with such flanges. So long as pressure is maintained the gaskets firmly seal the junction between the moving flanges 6 and 7 and the stationary sleeve 5. When the tire is inflated and the fluid pressure is cut off, then the gaskets are relieved from the air pressure against the faces of the flanges and friction of the parts is reduced to a minimum, due to the light spring pressure against the flanges ready for sealing the air connection immediately the fluid pressure is subsequently applied. If, however, the pressure is required to be maintained, owing to the need for continuously supplying compressed air for making good puncture leakage, the gaskets are held to their seats by the fluid pressure and only a small bearing friction results owing to the proximity of the gaskets to the centre of rotation of the flanges 6 and 7.

What I claim as my invention and desire to secure by Letters Patent is:—

1. Means for communicating fluid pressure from a stationary part to a rotary part, comprising inner and outer members each of which contains a passage for the flow of fluid, the inner central portion of said outer member and the outer central portion of said inner member forming radially opposed walls of an annular chamber to which the passages communicate and one of said members having two faces forming opposed walls of the chamber in an axial direction; anti-friction bearings between the inner member and the outer member to permit of free relative rotary motion between said members, two radially disposed annular gaskets on one of the members adapted to bear against said axially opposed faces of the other member and to seal the chamber when fluid pressure is received therein, and a light spring extending between said gaskets and tending to keep said gaskets lightly against said faces.

2. Means for communicating fluid pressure from a stationary part to a rotary part, comprising in combination, inner and outer members each of which contains a passage for the flow of fluid, the inner central portion of said outer member and the outer central portion of said inner member forming opposed walls of an annular chamber to which the passages communicate and one of said members having two radially disposed faces forming opposed walls of the chamber in an axial direction, anti-friction bearings on the inner member adapted to support the outer member and permit of free relative rotary motion between said members, two radially disposed annular gaskets on one of the members spaced inwards relatively to said radially disposed faces to bear flat against said faces to seal the chamber when fluid pressure is received therein and means disposed between said gaskets adapted to keep said gaskets lightly against said faces.

3. Means for communicating fluid pressure from a stationary part to a rotary part comprising, in combination, an inner annular member an outer central portion of which forms the inner wall of an annular chamber and has a passage for the flow of fluid communicating with said chamber, an outer annular member an inner central portion of which forms the outer wall of said chamber and has a passage for the flow of fluid communicating with said chamber, radially disposed annular flanges on one of said members at either side of its central portion forming opposed walls of the annular chamber in an axial direction, two radially disposed gaskets on the other member spaced inwards relatively to said radially disposed annular flanges to bear flat against said flanges under fluid pressure in said chamber to seal the chamber in opposed axial directions, so that the pressure in said chamber acts on said members equally in all radial directions and oppositely in both axial directions and anti-friction bearings supporting the outer member on the inner member and permitting free relative rotary motion between said members.

4. Means for communicating fluid pressure from a stationary part on a vehicle to a rotary hub comprising in combination, an inner member forming part of the hub having a passage leading to the tire of the wheel, an outer member arranged around the periphery of the hub having a passage from a source of supply of fluid pressure, two anti-friction bearings adapted to support the outer member on the inner member, two radially disposed gaskets on said outer member extending radially inwards toward the inner member and enclosing an annular space between them and two radially disposed side walls outstanding from the inner member and spaced outwardly from said gaskets so that the gaskets will bear flat against said walls when air is forced through said passages and said annular space.

In witness wherof I have hereunto set my hand.

RICHARD HURTLEY DANEEL.